Oct. 31, 1939.　　　　J. FERLA　　　　2,177,643
METHOD OF PRODUCING FIBROUS CEMENTITIOUS TUBES
Filed Jan. 12, 1938　　　3 Sheets-Sheet 1

Inventor
John Ferla
by Henry Mesh
Attorney.

Oct. 31, 1939.  J. FERLA  2,177,643
METHOD OF PRODUCING FIBROUS CEMENTITIOUS TUBES
Filed Jan. 12, 1938  3 Sheets-Sheet 2

Inventor
John Ferla
by Henry Cook
Attorney.

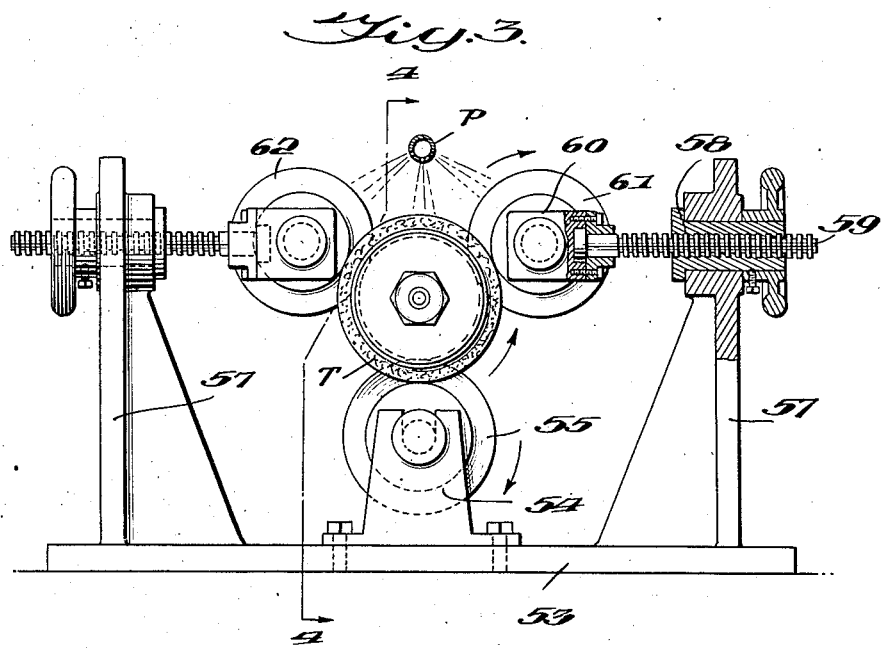
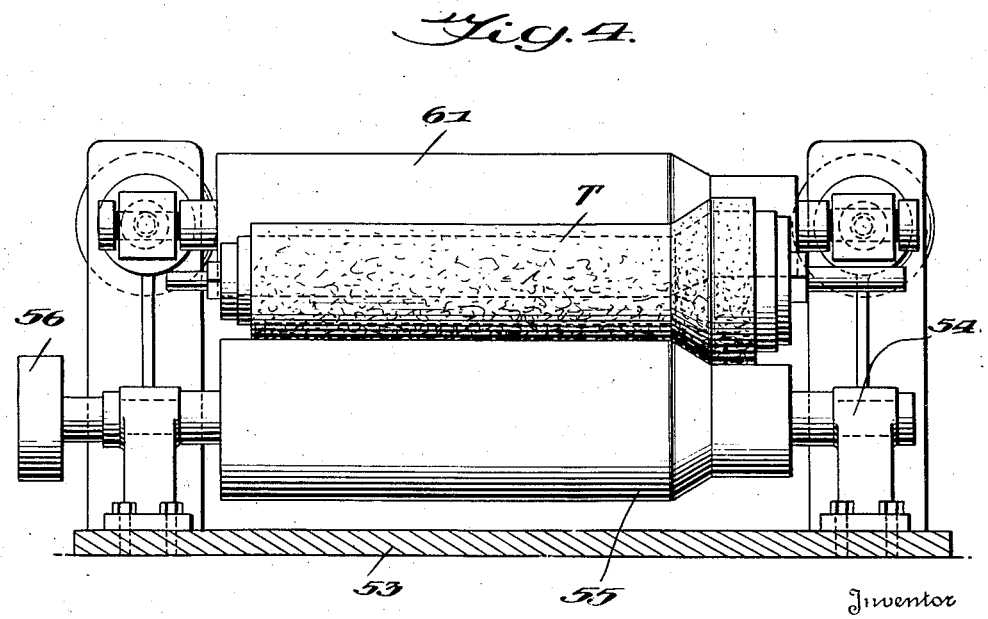

Patented Oct. 31, 1939

2,177,643

UNITED STATES PATENT OFFICE 2,177,643

METHOD OF PRODUCING FIBROUS CEMENTITIOUS TUBES

John Ferla, Chicago, Ill., assignor to Levi H. Blouch, Merchantville, N. J.

Application January 12, 1938, Serial No. 184,509

9 Claims. (Cl. 92—66)

The invention relates to a method of manufacturing tubes of a composition material, such as asbestos and cement, or pulp material.

The invention also broadly concerns the manufacture of sheeting by first producing a tubular structure, which is slitted along one longitudinal edge and developed into flat form.

While the invention deals primarily with tubes of asbestos and cement composition, it may be combined with other ingredients, such as infusorial earth, soapstone, talc, silica, hydrates of lime, water proofing compound, or any other refractory material capable of forming a binder with asbestos and cement.

In the art, it has been known to produce tubes or sheeting, either by a cardboard machine, which is a complicated apparatus and employs expensive felt conveyors and is wasteful, or by rotary or travelling screens, which also operate in conjunction with felt conveyors; so that the production of tubes or sheeting by these means becomes expensive and, in addition, entails other disadvantages, such as, for instance, that only low pressure tubes can be produced, which lack compactness and strength.

It is, therefore, one of the main objects of the present invention to provide a novel method of producing sheeting, tubes, or tubes with bell collars, which may be inexpensively manufactured, and which dispense with the employment of felt conveyors, and produce tubes which are compact, non-porous, and of high resistivity.

It is a further object of the invention to form the tube from a mixture of composition material, in which the water content and the cement content have a definite pre-determined ratio, so that the end product in the continuous operation of tubes is always of the same qualtity and efficiency.

It is a further object of the invention to provide a method whereby the composition material is first applied as a liquid pulp, which is utilized to form the basic or initial layer for the tube or sheet material, and to which additional layers of the same material, in almost dry state, are caused to adhere under compression, and build up to a thickness to suit the particular requirements of the tube or sheeting.

It is a further object of the invention to provide a method whereby tubes or sheeting can be produced as low as ⅛ of an inch in thickness, up to any required dimension.

It is also an object of the invention to provide a novel method of forming tubes or sheeting, which includes a composition capable of being mixed in the process of manufacture with water proof compound, so that the tubes or sheeting are inherently waterproof; and, if desired, surface water-proofing may be added.

Numerous other objects, equally as important as those mentioned, to become apparent from a perusal of the invention, which comprises the steps of a novel method capable of being carried out by means and apparatus, to be described in the following specification, particularly pointed out in the claims forming a part thereof, and illustrated by more or less diagrammatic views in the accompanying drawings, in which:

Fig. 3 is an end view of a calender machine.

Fig. 4 is a section on the line 4—4 of Fig. 3.

Fig. 5 is an assembly view of a modified molding apparatus.

Figure 1:
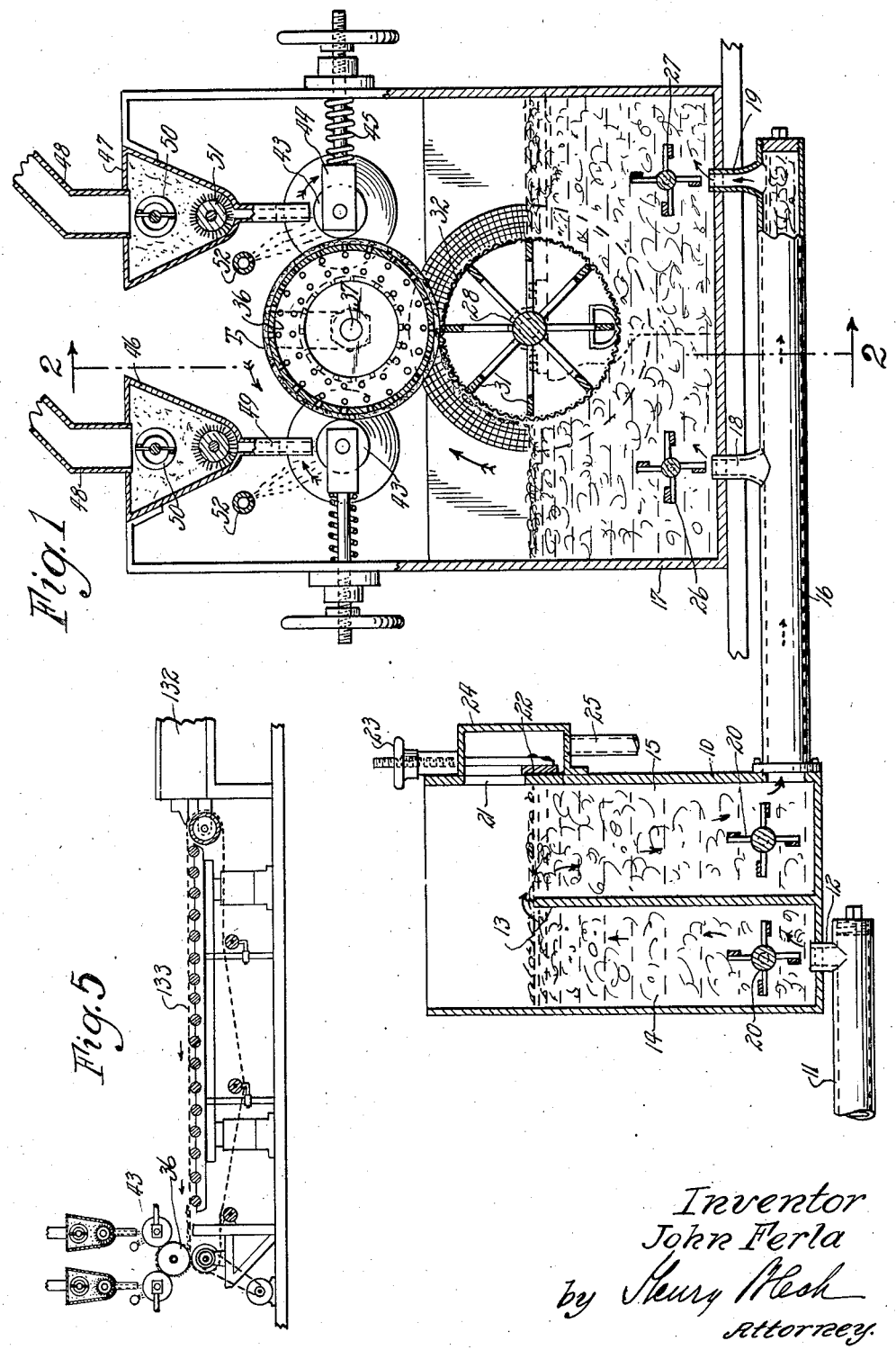
Fig. 1 is a sectional elevation of an apparatus capable of carrying out my new process.

In the manufacture of sheeting or tubes from composition material, preferably asbestos and cement and various other ingredients, it is very important that the mixture of the various ingredients shall have a predetermined fixed ratio, so as to insure a perfect end product.

It is for this reason that great care has been given to the solution of this problem and the present method has been evolved with the object in view of obtaining a product of uniform standard quality, which is non-porous, highly resistant and merchantable.

While the invention is particularly described with the manufacture of asbestos and cement tubes, it is, of course, understood that it is not limited to the particular ingredients mentioned, nor to the particular formation of tubes, but the invention may be applied wherever suitable, and is merely described by way of example, and not by way of limitation.

In forming asbestos cement tubes, the ingredients are first mixed in a dry state, the asbestos having been subjected to considerable treatment so as to remove any crude fibres, to render the same fluffy without diminishing the length of the fibres and to render the same capable of intimate mixture with other ingredients in dried form, whereupon the mixture is introduced in a beater which contains water, and is subjected to the influence of agitators.

From there, the mixture is conducted into a reservoir and thence into a vat 10 (Figs. 1 and 2), by a tube 11, which communicates, by a branch pipe 12, with the vat.

The vat 10 has a vertical partition 13, which extends upwardly through about ¾ the height of the vat, more or less, to thereby define the chambers 14 and 15.

The mixture is discharged from the tube 11 into the chamber 14, where it overflows into the chamber 15, whence tubes 16 lead to a large vat 17, with which the tubes 16 communicate by the outlets 18 and 19.

The vat 10 has an agitator 20 near the bottom of each chamber 14 and 15, and is provided at the top, with an opening 21, controlled by a vertical slidable gate 22, controlled by a hand-wheel 23, so that the lower edge of the opening 21 may be raised to vary the level of the mixture in the vats 10 and 17.

The opening 21 communicates with a casing 24, capable of receiving the overflow from the chamber 15, which passes through a drain pipe 25 and may be returned to the beater or other receptacle for reclaiming purposes.

The vat 17 is partially filled with a mixture having substantially the same level as the vat 10, by reason of their communication, and is provided with a plurality of agitators 26 and 27, to keep the mixture in agitation and maintain uniform consistency.

A horizontal shaft 28 extends longitudinally through the vat and is supported in bearings 29 and 30 provided on the outside of the vat and attached thereto.

Figure 2:
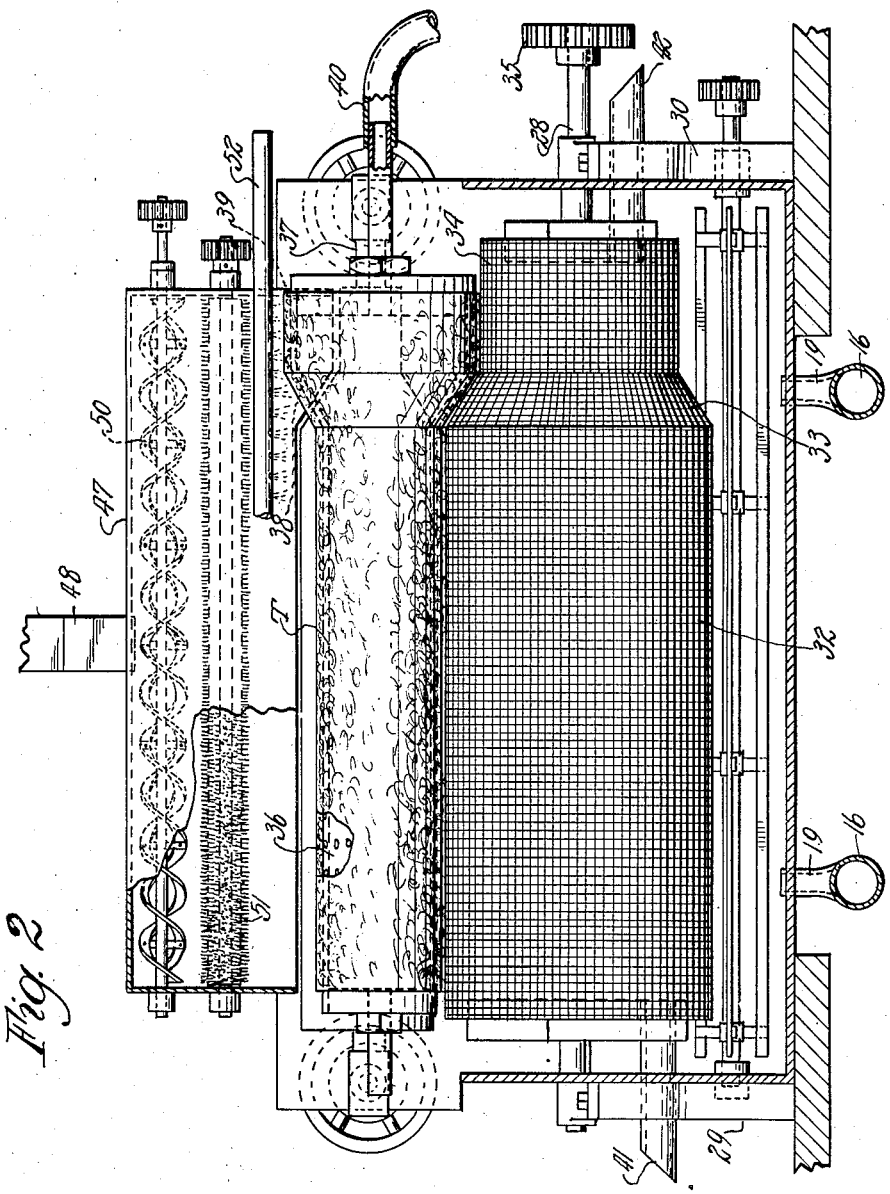
Fig. 2 is a section, partly in elevation, on the line 2—2 of Fig. 1.

The shaft 28 carries a spider frame 31 on which is mounted a cylindrical screen mold 32 which at the right end, as viewed in Fig. 2, is provided with a frusto-conical portion 33, and thence continues into a cylindrical portion 34 of smaller diameter than the body portion of the screen mold, for a purpose later to be described.

The shaft 28 is provided with a gear 35 to which power is imparted from any suitable source, so that the screen mold 32 is directly driven and is partly immersed in the mixture contained in the vat 17, and acts as a carrier for bringing the layers of the liquid mixture to a mandrel, generally designated by 36, which is supported on a horizontal shaft 37, and is formed on the right end as viewed in Fig. 2, with a frusto-conical portion 38, and then passes into a cylindrical portion of the mandrel 39, of larger diameter than the body portion of the mandrel.

It is obvious that a tube formed on the mandrel will take the same form, at the right end, as the frusto-conical and cylindrical portions of the mandrel, whereby a tube with a so-called bell collar on one end is produced.

The mandrel is provided with perforations throughout its length and its interior communicates with a pipe 40, which leads to a vacuum pump (not shown).

If desired, a strip of fabric may be placed on the mandrel to prevent the vacuum suction from drawing the mixture into and closing the perforations of the mandrel.

Drain pipes 41 and 42 serve to drain the water which enters the interior of the rotary screen in its rotation.

The mandrel 36 is engaged on each side by a roller 43, which is mounted in a bearing 44, adjustably mounted in a wall of the vat 17, there being a spring 45 interposed between the bearing and the wall of the vat to maintain each roller in resilient engagement with the mandrel.

Hoppers 46 and 47 are provided at the top of the vat to which the dry mixture of disintegrated fibrous cementitious material, preferably containing asbestos and cement, is supplied by chutes 48 and discharge the mixture through pipes 49 onto the rollers 43.

In each hopper, an agitator 50 is provided to keep the mixture agitated, and a brush roller 51, near the bottom of the hopper, regulates the rate of discharge.

A pipe 52, provided with perforations, emits a fine spray of water and sprays the same on top of each roller 43, so as to impart to the mixture just sufficient moisture to make the same adhere to the roller.

In operation, the liquid mixture in the vat 17 is brought upwardly by the rotary screen mold 32 and forms on the mandrel an initial layer due to the natural adherence of the wet mixture, enhanced by the suction effect maintained in the interior of the mandrel.

In the continuous rotation of the mandrel, by reason of its frictional engagement with the rotary screen mold, the dry mixture, slightly humidified, is superposed by the rollers 43 on to the initial layer formed by the rotary screen; so that, in a complete revolution of the mandrel, there are formed three layers, the first one being the initial layer produced by the rotary screen; thereafter the second layer of fairly dry mixture is imparted by the right roller 43, as viewed in Fig. 1; and thereafter the third layer is produced by the left roller 43, also of fairly dry mixture.

The fairly dry layers are compacted with the initial layers by pressure engagement of the rollers 43 which apply pressure to the respective added layers as applied to the initial layer and before the next succeeding layer is applied, and cause the initial layer to adhere to the mandrel, and this process is continued until the proper thickness of the tube is built up.

Attention is called to the fact that the mandrel is floatingly mounted so as to engage under gravity pressure the rotary screen mold. To this end the mandrel is supported in a bearing, which is open at the top, so that the mandrel can be lifted up vertically, as will be hereinafter referred to.

It is noteworthy that, when the initial layer is formed on the mandrel the vacuum or suction maintained therein aids in causing the initial layer to adhere on the mandrel; but that once the initial layer is formed, it also acts as an anchoring means for the substantially dry mixture to adhere thereto, and the continued use of the vacuum is utilized to remove the water which is extracted from the layers by the pressure of the rollers 43.

As soon as the tube of the desired thickness is built up, the rotary screen is, of course, brought to a standstill; the mandrel and the tube formed thereon are removed by lifting them out vertically or horizontally, and a new mandrel is put in place for the production of another tube.

After the tube has been built up on the mandrel 36, the mandrel and the tube, as a unit, are lifted out and placed in the calender machine, shown in Figs. 3 and 4. The same comprises a base 53, having bearings 54, in which is journaled a roller 55, provided with a pulley 56, to which power from any suitable source is imparted.

On the base 53 are also provided standards 57, each equipped with a bushing 58, to receive a threaded spindle 59 which, at its forward end, carries a frame 60, in which a roller 61 is journaled, adapted to contact with one side of the tube, which is still on the mandrel 36. A roller 62, mounted similarly to the roller 61, is engaging the tube on the other side thereof.

A pipe P is arranged above the tube and is provided with a series of perforations to emit waterproofing compound in vaporized state to spray the rollers 61, 62, and the tube T, so that, in addition to the inherent waterproof character of the tube, by reason of mixing a waterproof compound with the dry mixture, also a surface waterproofing may be provided.

In operation, the power driven roller 55 causes the tube and the mandrel to rotate, and by friction, rollers 61 and 62 are driven, which latter are calender rollers and impart a smooth finish to the surface, and also compact the same further.

If it is desired to give to the tube a rough surface, then the rollers are provided with grooves 63 (Fig. 4a) which produce fine ribs 64 on the tube, whereby the same is provided with greater strength.

It is, of course, to be understood that, when the tube is first formed on the mandrel, it is a roughly finished product and may be used for some purposes.

However, if a better appearing tube is desired, then it is placed in the calender machine, and further compacted, as stated before.

Referring to Fig. 5, the process described is carried out there with a slight modification. The liquid mixture is stored in a vat 132, whence it flows onto a travelling screen or endless conveyor 133, which is in engagement with the lower end of the mandrel 36, to impart thereto the initial layer while again the rollers 43, receiving substantially dry mixture, compact additional layers onto the initial layer, as has been described in conjunction with the apparatus shown in Fig. 1.

The main distinction is the fact that the rotary screen is replaced by the endless screen.

While the drawings show preferred embodiments of the apparatus for carrying out my novel method, numerous changes and alterations may be made without departing from the spirit of the invention.

I, therefore, do not limit myself to the details of construction and arrangement, as shown, nor to the sequence of steps of my method, but claim my invention as broadly as the state of the art permits.

I claim:

1. The method of forming tubes from a composition material essentially containing asbestos and cement, including the steps of forming an initial wet layer from a liquid suspension of said materials, transferring said layer directly to a hollow mandrel maintained under a vacuum to insure adherence of said initial layer, applying to a rotary moistened surface a layer of substantially dry asbestos and cement mixture which mixture is applied by the rotary surface onto the initial layer on the mandrel and applying pressure to the added layer upon application to the mandrel and before a next succeeding layer is applied, continuing to superpose moistened layers on wet layers and winding said layers on said mandrel until the desired thickness is built up, and compacting such layers on said mandrel to produce a non-porous tube.

2. The method of forming tubes from a composition material essentially containing asbestos and cement, including the steps of forming an initial wet layer from a liquid suspension of said materials, transferring said layer directly to a mandrel, applying to a movable moistened surface a layer of asbestos and cement mixture which mixture is transferred by the movable surface onto the initial layer while on the mandrel and applying pressure to the added layer upon application to the mandrel and before a next succeeding layer is applied, and continuing to superpose moistened layers on wet layers and winding said layers on said mandrel until the desired thickness is built up.

3. The method of forming tubes from a composition material essentially containing asbestos and cement, including the steps of forming an initial wet layer from a liquid suspension of said materials, directly transferring said layer to a hollow mandrel maintained under vacuum, applying to a rotary moistened surface a layer of asbestos and cement mixture which mixture is applied by the rotary surface onto the initial layer while on the mandrel and applying pressure to said layer upon application to the mandrel and before a next succeeding layer is applied, continuing to superpose moistened layers on wet layers and winding said layers on said mandrel until the desired thickness is built up, and compacting said layers on said mandrel to produce a non-porous tube.

4. The method of forming tubes from a composition material essentially containing asbestos and cement, including the steps of forming an initial wet layer from a liquid suspension of said materials, transferring said layer directly to a hollow mandrel engaging said layer under gravity pressure and maintained under a vacuum to insure adherence of said initial layer, applying to a rotary moistened surface a layer of asbestos and cement mixture which mixture is applied by the rotary surface onto the initial layer while on the mandrel and applying pressure to the added layer upon application to the mandrel and before a next succeeding layer is applied, continuing to superpose moistened layers on wet layers and winding said layers on said mandrel until the desired thickness is built up, and compacting such layers on said mandrel under radial pressure to produce a non-porous tube.

5. The method of forming tubes from a composition material essentially containing asbestos and cement, including the steps of partly submerging a rotary screen mold in a bath of liquid suspension of said materials, rotating a mandrel in peripheral surface contact with said screen mold while transferring the wet layer adhering to said screen mold to said mandrel, applying a dry mixture of asbestos and cement to a moistened roller bearing against the mandrel thereby applying to the initial layer a layer of moistened mixture of asbestos and cement and applying pressure to the added layer upon application to the mandrel and before a next succeeding layer is applied, continuing to superpose moistened layers on wet layers and winding said layers on said mandrel under pressure until the desired thickness is built up and a non-porous tube produced.

6. The method of forming tubes from a composition material essentially containing asbestos and cement, including the steps of partly submerging a rotary screen mold in a bath of liquid suspension of said materials, rotating a hollow mandrel in peripheral surface contact with said screen mold while transferring the wet layer adhering to said screen mold to said mandrel maintained under a vacuum to assure adherence of said initial layer, applying a dry mixture of asbestos and cement to a moistened roller bearing against the mandrel thereby applying to the initial layer a layer of moistened mixture of asbestos and cement and applying pressure to the added layer upon application to the mandrel and before a next succeeding layer is applied, continuing to superpose moistened layers on wet layers and winding said layers on said mandrel under pressure until the desired thickness is built up and a non-porous tube produced.

7. The method of forming tubes from a fibrous cementitious composition comprising forming an initial wet layer from a liquid suspension of said material, transferring said layer directly to a mandrel, superposing on said layer while on the mandrel a second layer of moistened disintegrated fibrous cementitious material, applying pressure to the last-mentioned layer upon application to the mandrel and before a next succeeding layer is applied, and continuing to superpose moistened layers on wet layers on the mandrel until the desired thickness is built up.

8. The method of forming tubes from a fibrous cementitious composition comprising forming an initial wet layer from a liquid suspension of said material, transferring said initial layer to a mandrel, applying a dry fibrous cementitious material to a moistened surface for slightly moistening said dry material, and thereafter moving said surface with the moistened material thereon into superposed relation with the initial layer transferring the moistened layer from said surface onto the initial layer while applying pressure to said moistened layer on the mandrel before a subsequent layer is applied.

9. A method of forming tubes from a fibrous cementitious composition comprising forming an initial wet layer from a liquid suspension of said material, transferring said layer to a mandrel, applying to a rotary surface a layer of disintegrated fibrous cementitious material which material is moistened and is applied by said rotary surface onto the initial layer while on the mandrel and applying pressure to said added layer upon application to the mandrel and before a next succeeding layer is applied, and continuing to superpose moistened layers on wet layers on the mandrel until the desired thickness is built up.

JOHN FERLA.